US010539925B2

(12) United States Patent
Ziegler et al.

(10) Patent No.: US 10,539,925 B2
(45) Date of Patent: Jan. 21, 2020

(54) TECHNIQUES FOR PROCESSING HOLOGRAPHIC RECORDING MEDIA

(71) Applicant: North Inc., Kitchener (CA)

(72) Inventors: David Ziegler, Lausanne (CH); Mickael Guillaumee, Neuchâtel (CH); Christophe Moser, Lausanne (CH)

(73) Assignee: North Inc., Kitchener, ON (CA)

(*) Notice: Subject to any disclaimer, the term of this patent is extended or adjusted under 35 U.S.C. 154(b) by 0 days.

(21) Appl. No.: 15/394,416

(22) Filed: Dec. 29, 2016

(65) Prior Publication Data

US 2018/0188689 A1    Jul. 5, 2018

(51) Int. Cl.
*G03H 1/02*     (2006.01)
*G03H 1/18*     (2006.01)
(Continued)

(52) U.S. Cl.
CPC ......... *G03H 1/181* (2013.01); *G02B 27/0172* (2013.01); *G03H 1/02* (2013.01); *G03H 1/0248* (2013.01); *G03H 1/0402* (2013.01); *G03H 1/265* (2013.01); *G03H 1/2645* (2013.01); *G02B 5/32* (2013.01); *G02B 27/58* (2013.01); *G02B 2027/0174* (2013.01); *G02B 2027/0178* (2013.01); *G03H 2001/0439* (2013.01); *G03H 2001/266* (2013.01); *G03H 2260/30* (2013.01)

(58) Field of Classification Search
CPC ........ G03H 1/02; G03H 1/26; G02B 27/0172; G02B 5/1857
USPC .............................. 359/3, 15, 23; 430/502, 2
See application file for complete search history.

(56) References Cited

U.S. PATENT DOCUMENTS 4,506,008 A * 3/1985 Sugimoto ................ G03C 1/46
                                                    430/502
8,257,885 B1 * 9/2012 Efimov ................ G02B 5/1857
                                                    359/3
(Continued)

FOREIGN PATENT DOCUMENTS

WO    2014155288    10/2014

OTHER PUBLICATIONS

"Photochemical and diffusional apodization of high-efficiency thick phase holograms", Popov et al, SPIE vol. 2215, Photonics for Space Environments II (1994) (Year: 1994).*

*Primary Examiner* — Audrey Y Chang
(74) *Attorney, Agent, or Firm* — Thomas Mahon

(57) ABSTRACT

Various embodiments are generally directed to techniques for processing holographic recording media. Some embodiments are particularly directed to processing a raw holographic recording medium into an apodized holographic recording medium. For example, a raw holographic recording medium may include a plurality of photosensitive molecules uniformly distributed throughout that are able to record an interference pattern to create a hologram. However, when a photosensitive molecule is desensitized, such as by exposure to incoherent light, its photosensitivity is lost and the molecule may no longer be able to record an interference pattern of coherent light. Various embodiments described herein may include an apodized holographic recording medium that has been exposed to incoherent light in a manner to desensitize some photosensitive molecules therein such that the remaining photosensitive molecules have a non-uniform distribution.

42 Claims, 11 Drawing Sheets

(51) Int. Cl.
*G03H 1/04* (2006.01)
*G03H 1/26* (2006.01)
*G02B 27/01* (2006.01)
*G02B 27/58* (2006.01)
*G02B 5/32* (2006.01)

(56) References Cited

U.S. PATENT DOCUMENTS

| | | | |
|---|---|---|---|
| 9,846,307 B2* | 12/2017 | Tremblay | G02B 27/0172 |
| 2008/0049282 A1* | 2/2008 | Moss | G02B 5/0252 |
| | | | 359/23 |
| 2010/0208313 A1* | 8/2010 | Horgan | G03H 1/0005 |
| | | | 359/2 |
| 2017/0219829 A1* | 8/2017 | Bailey | G02B 27/0172 |

* cited by examiner

Arranging a holographic recording medium comprising a top surface, a bottom surface, and a set of photosensitive molecules with a uniform distribution between the top surface and the bottom surface for exposure to a first beam of incoherent light arranged at a first angle of incidence with respect to the top surface and a second beam of incoherent light arranged at a second angle of incidence with respect to the bottom surface
802

Exposing the holographic recording medium to the first and second beams of incoherent light to desensitize a first subset of the set of photosensitive molecules to leave a second subset of the set of photosensitive molecules with a non-uniform distribution between the top surface and the bottom surface of the holographic recording medium
804

TECHNIQUES FOR PROCESSING HOLOGRAPHIC RECORDING MEDIA

BACKGROUND

Holography can refer to the science and practice of making holograms. Holography can enable a light field, which is generally the product of a light source scattered off objects, to be recorded and later reconstructed when the original light field is no longer present, due to the absence of the original objects. The light field may be recorded in a medium referred to as a holographic recording medium. Once a light field is recorded in a holographic recording medium, the holographic recording medium may be referred to as a hologram.

BRIEF DESCRIPTION OF THE DRAWINGS

FIG. 8 illustrates an embodiment of a first logic flow.

DETAILED DESCRIPTION

Figure 1A:
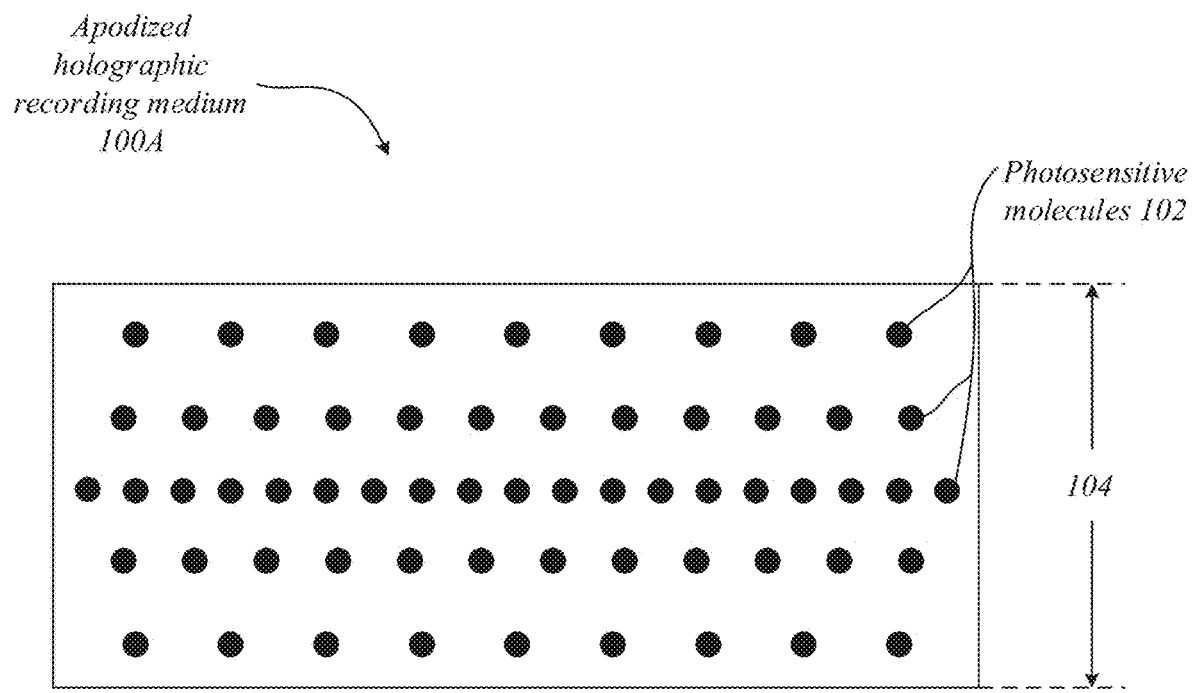
FIGS. 1A-1B illustrate embodiments of an apodized holographic recording medium.

Various embodiments are generally directed to techniques for processing holographic recording media. Some embodiments are particularly directed to processing a raw holographic recording medium into an apodized holographic recording medium. For example, a raw holographic recording medium may include a plurality of photosensitive molecules uniformly distributed throughout that are able to record an interference pattern to create a hologram. However, when a photosensitive molecule is desensitized, such as by exposure to incoherent light, its photosensitivity is lost and the molecule may no longer be able to record an interference pattern of coherent light. Various embodiments described herein may include an apodized holographic recording medium that has been exposed to incoherent light in a manner to desensitize some photosensitive molecules therein such that the remaining photosensitive molecules have a non-uniform distribution. For example, an apodized holographic recording medium may have a top surface and a bottom surface, with the concentration of photosensitive molecules moving from a low concentration near the top and bottom surfaces to a high concentration in the middle. In some embodiments, the concentration of photosensitive molecules in an apodized holographic recording medium may correlate to, adhere to, or be described by a non-uniform apodization function, such as a Gaussian distribution function. In some embodiments, the apodized holographic recording medium may be used to record multiplexed optical functions. For example, an apodized holographic recording medium with multiplexed optical functions recorded therein may be used as a combiner element in a computer-mediated reality device.

Some challenges facing holographic recording media include the inability to record multiplexed optical functions, such as in an optical combiner of a computer-mediated reality device, without a perceivable amount of diffraction between different multiplexed optical functions. The diffraction between different multiplexed optical functions may manifest as side lobes in the diffraction curve of the holographic recording medium. The diffraction between different multiplexed optical functions may be referred different wavelength channels. Cross-talk may cause undesirable performance in a holographic recording media with multiplexed optical functions recorded therein. For example, in a computer-mediated reality device, this cross-talk may be visible to a user as shifted background images or ghost images. These and other factors may result in holographic recording media with poor performance and limited ability to record multiplexed optical functions. Such limitations can drastically reduce the usability and applicability of holographic recording media, contributing to inefficient systems with reduced capabilities.

Various embodiments described herein include an apodized holographic recording medium to efficiently and effectively record multiplexed optical functions while preventing a perceivable amount of diffraction between different multiplexed optical functions, such as ghost images caused by cross-talk. For instance, the distribution of photosensitive molecules throughout the thickness of a raw holographic recording medium may be tailored to produce an apodized holographic recording medium with a predefined modulation of the variation of the refractive index throughout the thickness, also referred to as an apodized grating structure. In these and other ways an apodized holographic recording medium may enable flexible and efficient recording of multiplexed optical functions to achieve better performing, more desirable, and more dynamic holographic recording media, resulting in several technical effects and advantages.

In various embodiments, a holographic recording medium may include a top surface, a bottom surface, and a set of photosensitive molecules with a uniform distribution of photosensitive molecules between the top surface and the bottom surface. A first beam of incoherent light may be arranged at a first angle of incidence with respect to the top surface and a second beam of incoherent light may be arranged at a second angle of incidence with respect to the bottom surface. The first and second beams of incoherent light may desensitize a first subset of the set of photosensitive molecules. Desensitization of the first subset of photosensitive molecules may leave a second set of photosensitive molecules with a non-uniform distribution.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a selfconsistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1A illustrates an embodiment of an apodized holographic recording medium 100A. Apodized holographic recording medium 100A may include photosensitive molecules 102 and thickness 104. The photosensitive molecules 102 may have a non-uniform distribution throughout the thickness 104 of the apodized holographic recording medium 100A. In various embodiments, the non-uniform distribution of photosensitive molecules 102 may be selected to improve optical properties of multiplexed optical functions recorded therein, such as to reduce ghost images resulting from cross-talk between multiplexed optical functions. In the illustrated embodiment, the highest concentration of photosensitive molecules 102 may be at the center of thickness 104 and the lowest concentration of photosensitive molecules 102 may be at the extents of thickness 104. In various embodiments the distribution of photosensitive molecules 102 may correlate to, adhere to, or be described by a predetermined mathematical function, such as a non-uniform apodization function, which will be described in more detail below (see e.g., FIG. 1C). Embodiments are not limited in this context.

Figure 1B:
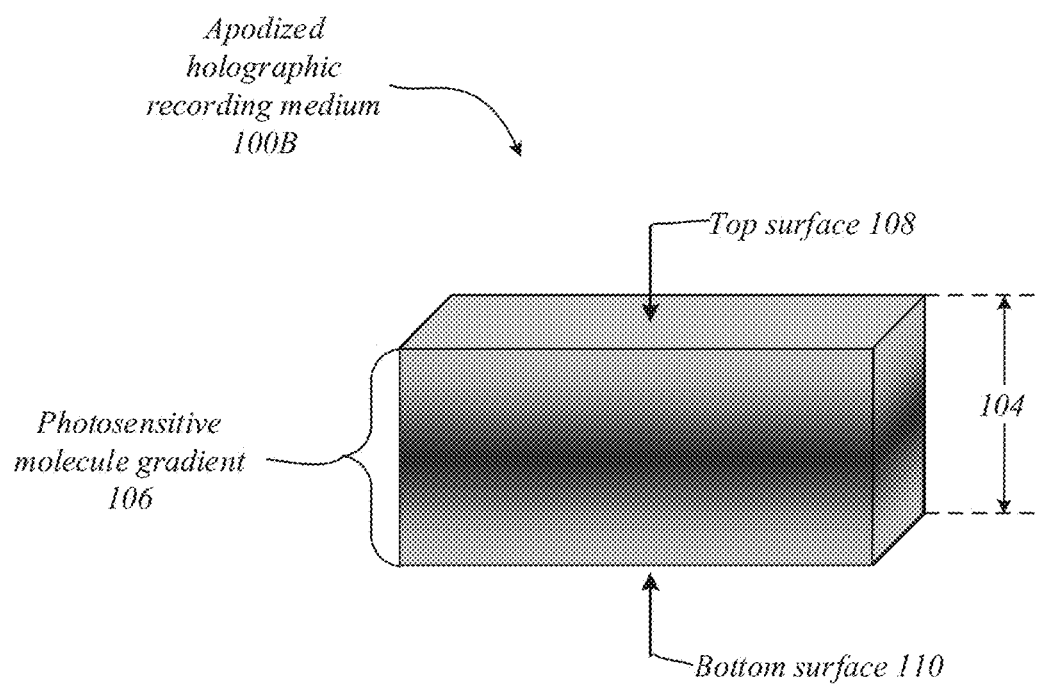

FIG. 1B illustrates another embodiment of apodized holographic recording medium 100B. Apodized holographic recording medium 100B may include thickness 104, photosensitive molecule gradient 106, top surface 108, and bottom surface 110. The darker portions of photosensitive molecule gradient 106 may represent higher concentrations of photosensitive molecules 102, while the lighter portions of photosensitive molecules gradient 106 may represent low concentrations of photosensitive molecules 102. Thus, the concentration of photosensitive molecules 102 may be low near the top and bottom surfaces 108, 110 and high halfway between the top and bottom surfaces 108, 110. Further, thickness 104 may also refer to the distance between the top surface 108 and the bottom surface 104. Embodiments are not limited in this context.

For ease of understanding, apodized holographic recording medium 100A may be a two-dimensional representation and apodized holographic recording medium 100B may be a three-dimensional representation of the same apodized holographic recording medium 100. Thus, apodized holographic recording medium 100A and apodized holographic recording medium 100B may be different representations of the same apodized holographic recording medium 100 with the different representations being used to emphasize different aspects of apodized holographic recording media disclosed here. For example, apodized holographic recording medium 100A includes individual photosensitive molecules 102 and apodized holographic recording medium 100B includes photosensitive molecule gradient 106, top surface 108, and bottom surface 110. Accordingly, different representations of apodized holographic recording medium 100 may be used interchangeably herein to simplify and clarify explanations.

In various embodiments, the index of refraction of apodized holographic recording medium 100 may continuously vary throughout the thickness 104. In various such embodiments, controlling concentration of photosensitive molecules 102 throughout the thickness 104 of apodized holographic recording medium 100 may enable the variation of the index of refraction to be tailored or modulated throughout thickness 104. This will be described in more detail below (see e.g., FIG. 1D). In some embodiments, tailoring or modulating the variation of the index of refraction in apodized holographic recording medium 100 may improve optical properties of multiplexed optical functions recorded therein, such as by reducing ghost images produced by cross-talk. In various embodiments, apodized holographic recording medium 100 may be used as a recording medium for a volume hologram. A volume hologram may refer to a hologram in which the thickness (e.g., thickness 104) of the recording medium (e.g., apodized holographic recording medium 100) is larger than the wavelength of light used for recording. In some embodiment, diffraction of light waves from a volume hologram may only occur when a light wave has a certain wavelength and shape. As used herein, when apodized holographic recording medium 100 is used as the recording medium for a volume hologram, the resulting volume hologram may be referred to as an apodized volume hologram.

Figure 1C:
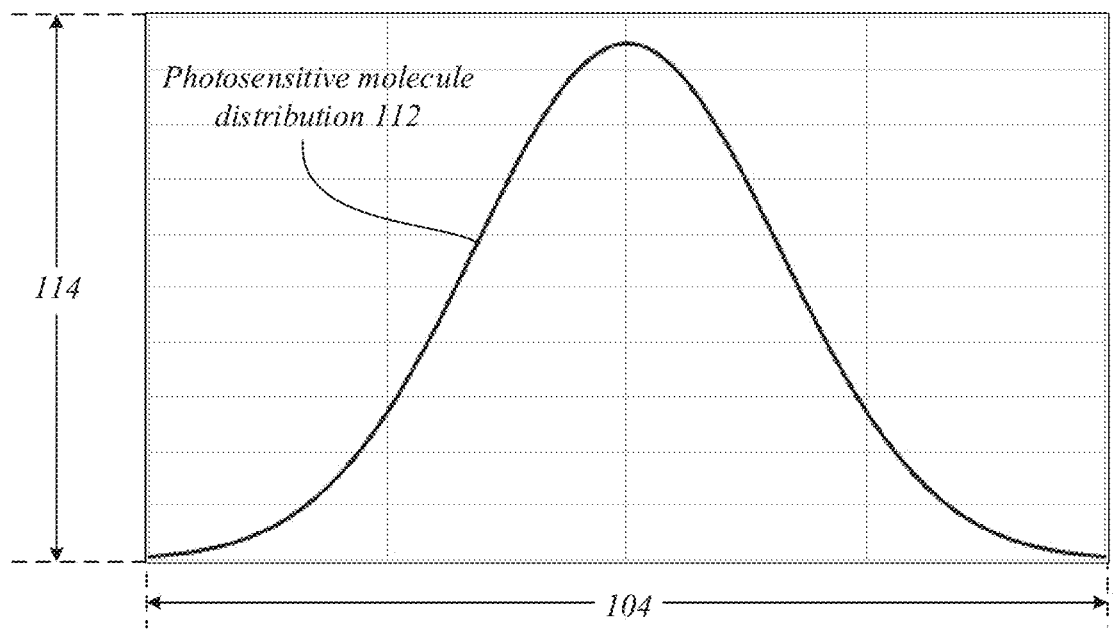
FIG. 1C illustrates an embodiment of a photosensitive molecule distribution of an exemplary apodized holographic recording medium.

FIG. 1C illustrates an embodiment of a photosensitive molecule distribution 112 of apodized holographic recording medium 100. The photosensitive molecule distribution 112 may graphically represent variation in concentration 114 of photosensitive molecules 102 throughout the thickness 104 of apodized holographic recording medium 100. As previously mentioned, the distribution of photosensitive molecules 102, illustrated herein as photosensitive molecule distribution 112, may correlate to, adhere to, or be described by a predetermined mathematical function, such as a non-uniform apodization function. In some embodiments, a non-uniform apodization function may include one or more of a Bartlett, Blackman, Connes, cosine, Gaussian, Hamming, Hanning, Welch, and similar functions. In various embodiments, adhering to or being described by a non-uniform apodization function may indicate that the highest concentration 114 of photosensitive molecules 102 in apodized holographic recording medium 100 may be at or around the center or middle of thickness 104 and the concentration 114 of photosensitive molecules 102 may decrease as the extents of thickness 104 are approached (e.g., top surface 108 and/or bottom surface 110). Embodiments are not limited in this context.

Figure 1D:
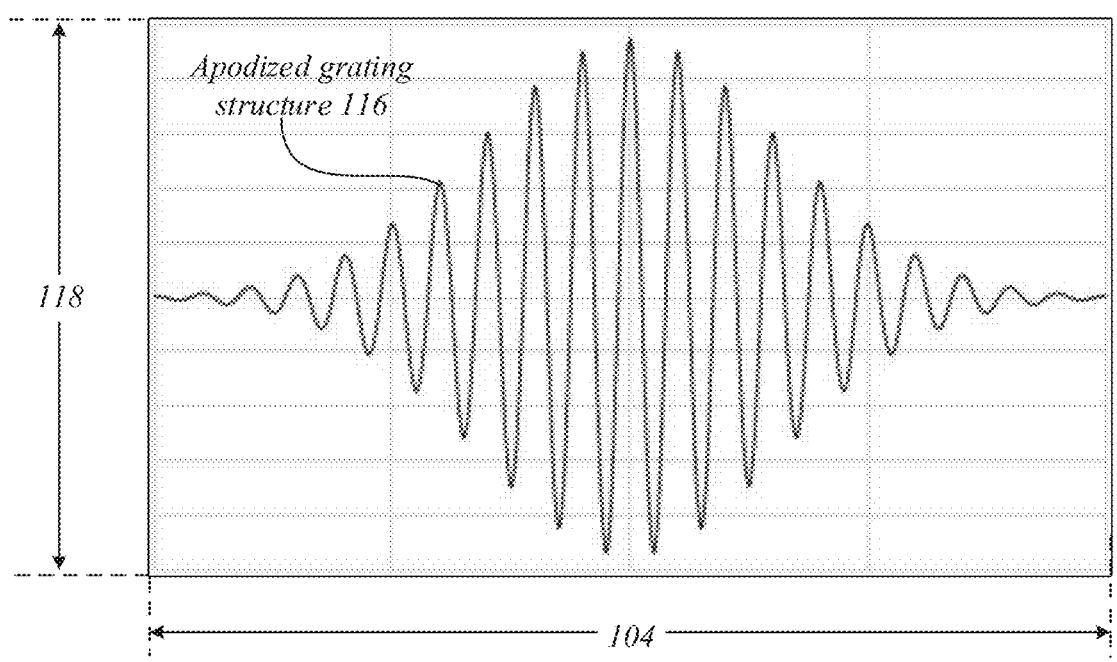
FIG. 1D illustrates an embodiment of an apodized grating structure of an exemplary apodized holographic recording medium.

FIG. 1D illustrates an embodiment of an apodized grating structure 116 of apodized holographic recording medium 100. The apodized grating structure 116 may graphically represent variation in index of refraction 118 throughout the thickness 104 of apodized holographic recording medium 100. As previously mentioned, the index of refraction of apodized holographic recording medium 100 may continuously vary throughout the thickness 104 and controlling concentration 114 of photosensitive molecules 102 throughout the thickness 104 of apodized holographic recording medium 100 may enable the variation of the index of refraction to be tailored or modulated throughout thickness 104. This tailoring or modulation may result in apodized grating structure 116. In various embodiments, tailoring or modulating the variation of the index of refraction in apodized holographic recording medium 100 may improve optical properties of apodized volume holograms created therefrom. For instance, modulating the variation of the index of refraction may prevent cross-talk between multiplexed optical functions recorded in the apodized holographic recording medium 100. Embodiments are not limited in this context.

In various embodiments, in the apodized grating structure 116, the index of refraction 118 may continuously vary or oscillate between an upper envelope and a lower envelope. In some embodiments, the continuous variation of the index of refraction 118 in apodized gating structure 116 may correlate to, adhere to, or be described by modulation of a function that oscillates. In various embodiments, the modulation of the variation of the refractive index through the thickness 104 of the apodized holographic recording medium 100, the upper envelope, and/or the lower envelope may have a shape that is the same or similar to (e.g., an inversion of) the shape of one or more non-uniform apodization functions described herein with respect to the variation of the concentration 114 of photosensitive molecules 102 throughout the thickness 104 of apodized holographic recording medium 100, such as in photosensitive molecule distribution 112. In some embodiments, a target shape of apodized grating structure 116, and thereby the target variation of the index of refraction, may be based on or caused by instituting a target photosensitive molecule distribution 112 in the apodized holographic recording medium 100. However, any means to tailor the variation of the index of refraction in a holographic recording medium that can lead to a reduction of ghost images caused by cross-talk between multiplexed optical functions can be used without departing from the scope of the present disclosure.

Figure 2:
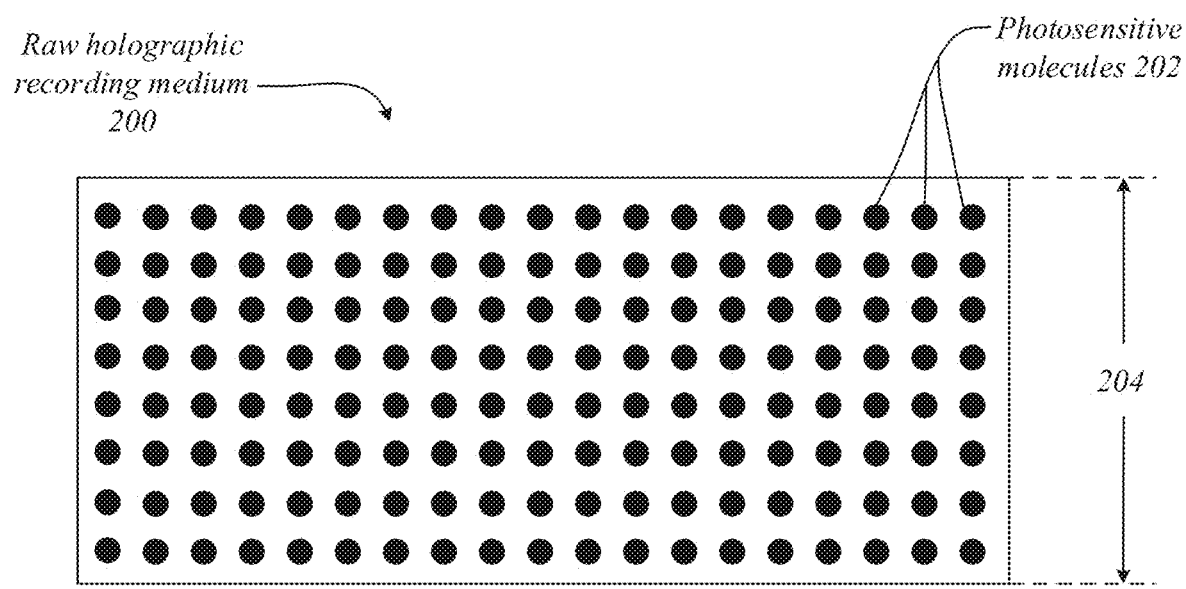
FIG. 2 illustrates an embodiment of a raw holographic recording medium.

FIG. 2 illustrates an embodiment of a raw holographic recording medium 200. Raw holographic recording medium may include photosensitive molecules 202 and thickness 202. In various embodiments apodized holographic medium 100 is created from raw holographic recording medium 200. In other words, raw holographic recording medium 200 may be processed to create apodized holographic recording medium 100 and achieve a target variation of the index of refraction. The photosensitive molecules 202 may have a uniform distribution throughout the thickness of raw holographic recording medium 200. In various embodiments, a uniform distribution of photosensitive molecules 202 may indicate that a concentration of photosensitive molecules 202 remains substantially constant throughout the thickness 204 of raw holographic recording medium 200. In some embodiments, a uniform distribution may indicate that the photosensitive molecules 202 in raw holographic recording medium 200 are evenly spaced apart. In some embodiments, the thickness 204 raw holographic recording medium 200 may be selected to improve optical properties of apodized holographic recording medium 100 created therefrom. In various embodiments the thickness 204 of raw holographic recording medium may be the same the thickness 104 of apodized holographic recording medium 100 created therefrom. Embodiments are not limited in this context.

In some embodiments, the concentration of photosensitive molecules 202 may be uniform throughout the thickness 204 of raw holographic recording medium 200. In various embodiments, the amount and/or concentration of photosensitive molecules 202 in raw holographic recording medium 200 may be altered to create apodized holographic recording medium 100. In various such embodiments, photosensitive molecules 102 may be a subset of photosensitive molecules 202. In some embodiments, the raw holographic recording medium 200 may be processed to desensitize or consume one or more of photosensitive molecules 202 to create photosensitive molecule distribution 112 of apodized holographic recording medium 100. For example, photosensitive molecules 202 may be chemically consumed to create photosensitive molecule distribution 112. In some embodiments, multiple raw holographic recording media with different concentrations of photosensitive molecules 202 may be layered to create apodized holographic recording medium 100. In various embodiments, raw holographic recording medium 200 may be processed after an interference pattern has been recorded therein to create an apodized volume hologram. As will be described in more detail below (see e.g., FIGS. 3A-3B), exposure to incoherent light may be used to desensitize one or more of photosensitive molecules 202 to create a specific photosensitive molecule distribution to achieve a target variation in the index of refraction through the thickness 104 of apodized holographic recording medium 100. It will be appreciated that other ways to achieve a target variation in the index of refraction through the thickness 104 of apodized holographic recording medium 100 may be utilized without departing from the scope of this disclosure.

Figure 3A:
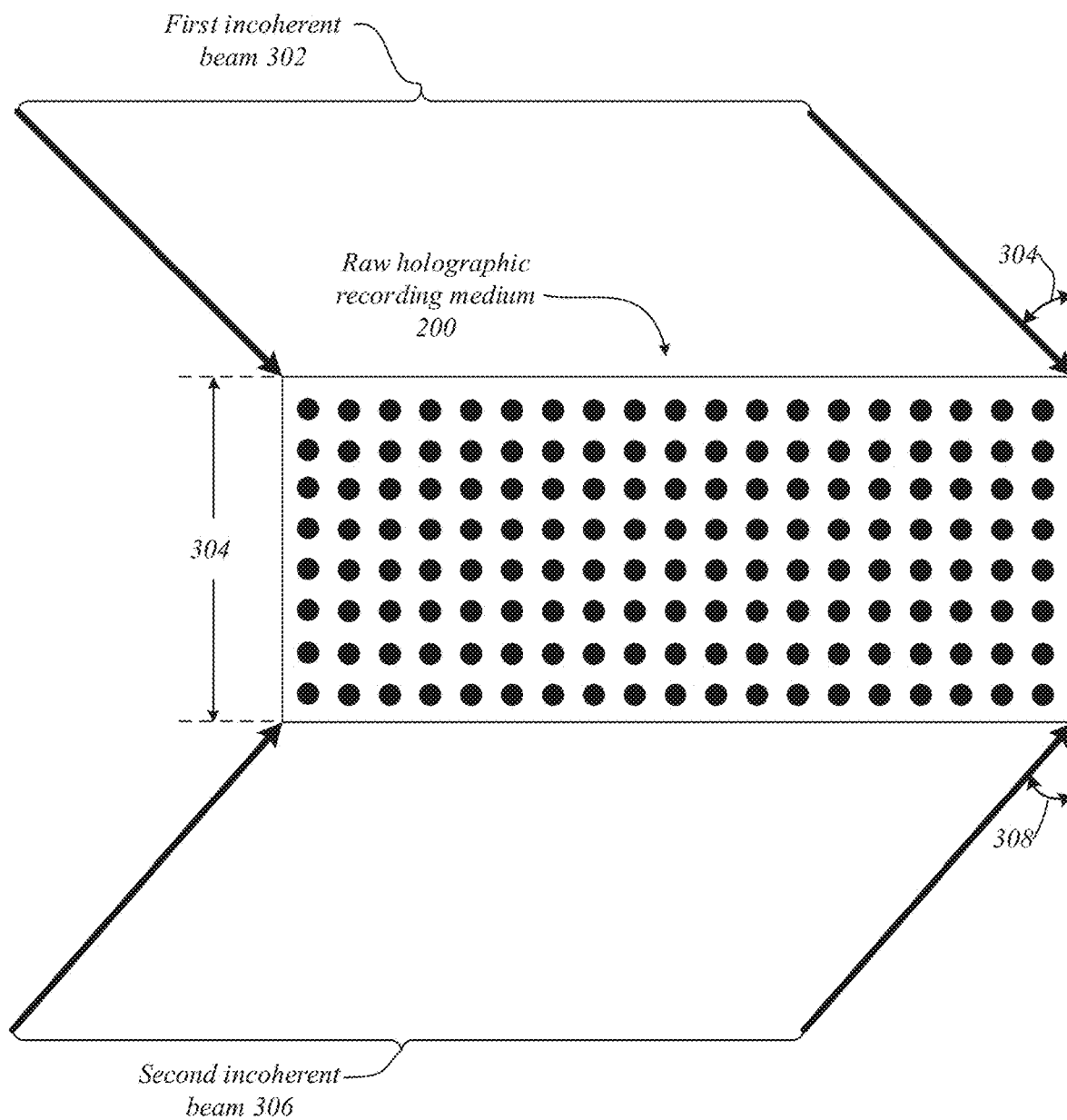
FIGS. 3A-3B illustrate exemplary arrangements to process a raw holographic recording medium into an apodized holographic recording medium.
Figure 3B:
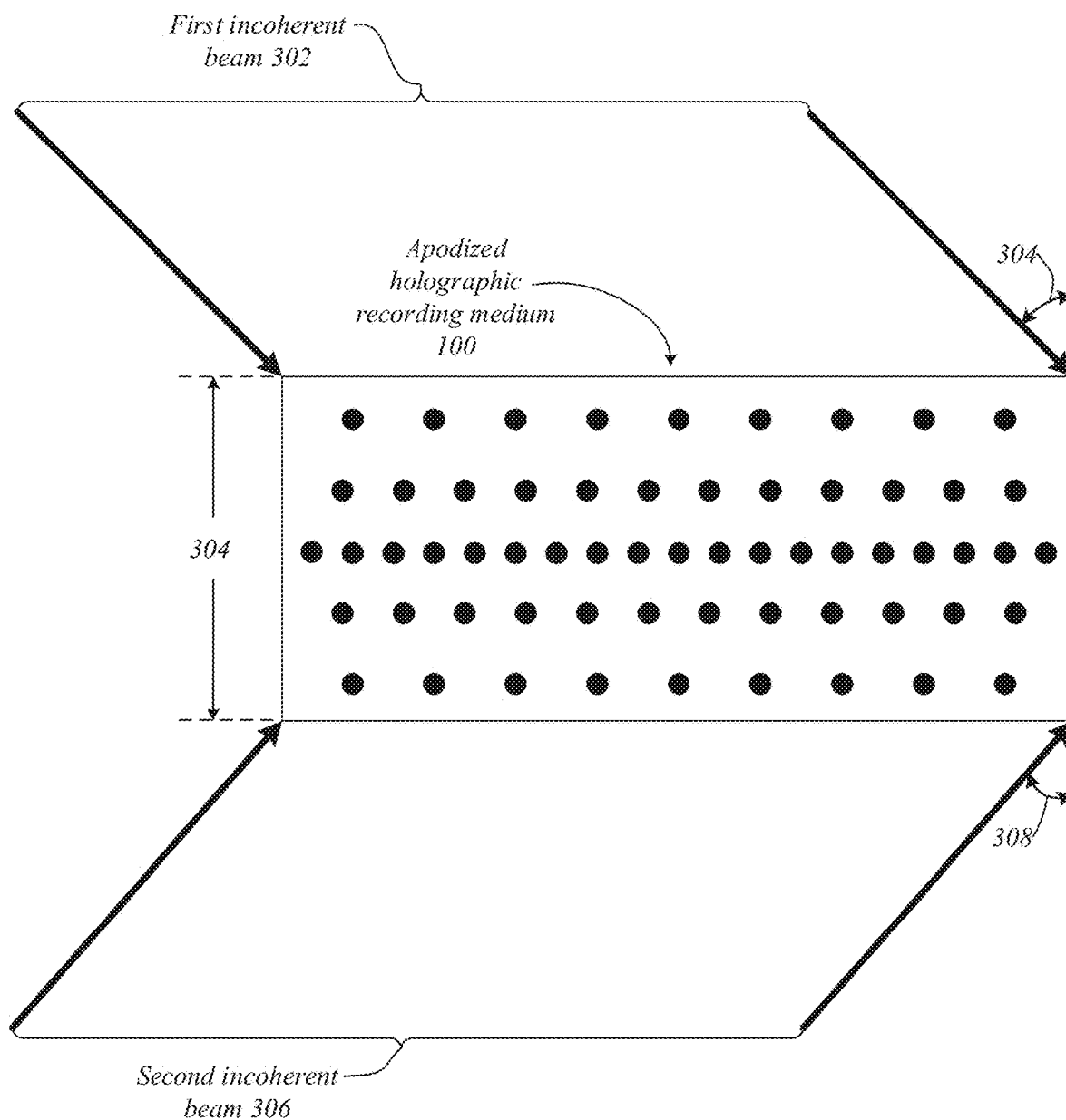

FIGS. 3A-3B illustrate exemplary arrangements 300A, 300B to process raw holographic recording medium 200 into apodized holographic recording medium 100. Exemplary arrangements 300A, 300B may illustrate processing raw holographic recording medium 200 into apodized holographic recording medium 100 by exposing raw holographic recording medium 200 to a first incoherent beam 302 with a first angle of incidence 304 and a second incoherent beam 306 with a second angle of incidence 308. In some embodiments, angle of incidence 304 may be with respect to a ray normal to top surface 108 and angle of incidence 306 may be with respect to a ray normal to bottom surface 110. Embodiments are not limited in this context.

In various embodiments, arrangement 300A may illustrate pre-exposure of raw holographic recording medium 200 to incoherent beams 302, 306. In various such embodiments, arrangement 300B may illustrate a gradient of photosensitive molecules (e.g., photosensitive molecule gradient 106) throughout thickness 304 in apodized holographic recording medium 100 produced by the pre-exposure of raw holographic recording medium 200 to incoherent beams 302, 306. In some embodiments, due to the absorption of the incoherent beams 302, 306 by raw holographic recording medium 200, more photosensitive molecules 202 are desensitized or bleached out near the edges than in the center of thickness 304. In some such embodiments, this may enable creation of a predefined or target distribution of photosensitive molecules 102 in apodized holographic recording medium 100, resulting in a tailored modulation of the variation of the refractive index through the thickness 304 of apodized holographic recording medium 100. In various embodiments, the tailored modulation of the variation of the refractive index through thickness 304 of apodized holographic recording medium 100 may reduce or eliminate perceivable cross-talk between any multiplexed optical functions recorded therein. In some embodiments, incoherent beams 302, 306 may be the same incoherent beam.

In some embodiments, exposure of the raw holographic recording medium 200 to first and second incoherent beams 302, 306 may desensitize one or more of photosensitive molecules 202 through thickness 304 to process raw holographic recording medium 200 into apodized holographic recording medium 100 with photosensitive molecules 102. In some such embodiments, photosensitive molecules 102 may be a subset of photosensitive molecules 202. Photosensitive molecules 102 may have a tailored distribution through thickness 304, such as photosensitive molecule distribution 112 for thickness 104, that results in a target modulation of the variation of the refractive index through the thickness 304, such as apodized grating structure 116 for thickness 104.

The shape of the tailored distribution may depend on one or more of the absorption of the material (and therefore on the wavelength of incoherent beams 302, 306), the angles of incidence 304, 308, and the power ratio of the incoherent beams 302, 306. In some embodiments one or more of the wavelength, angle of incidence 304, 308 of incoherent beams 302, 306, and the power ratio may be tuned to produce a target gradient in photosensitive molecules 102. In some such embodiments, one or more of the wavelength and angle of incidence 304, 308, and power ratio of incoherent beams 302, 306 may be altered during exposure of raw holographic recording medium 200 to achieve a target gradient in photosensitive molecules 102.

Figure 4A:
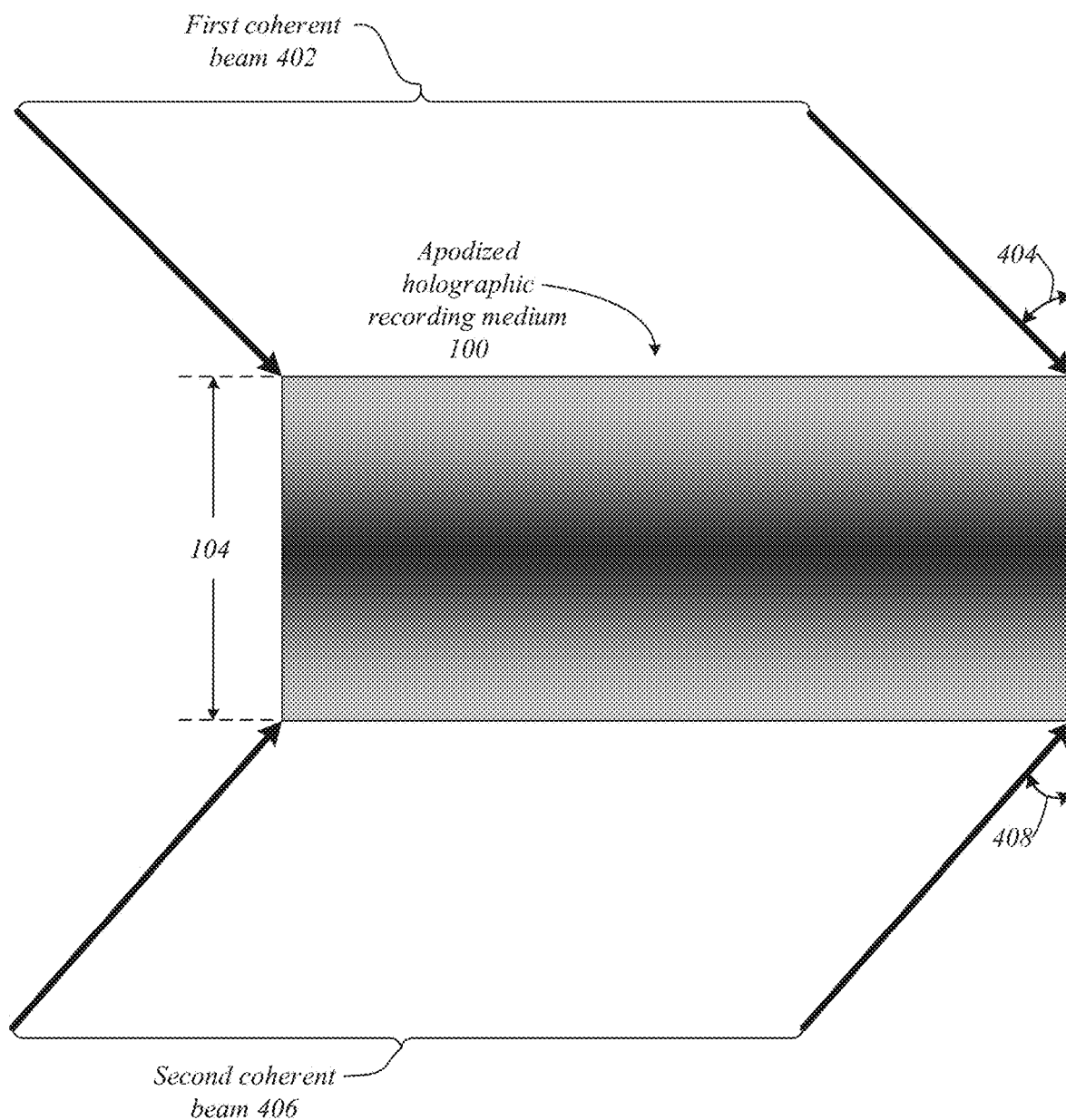
FIGS. 4A-4B illustrate exemplary arrangements to process an apodized holographic recording medium into an apodized volume hologram.
Figure 4B:
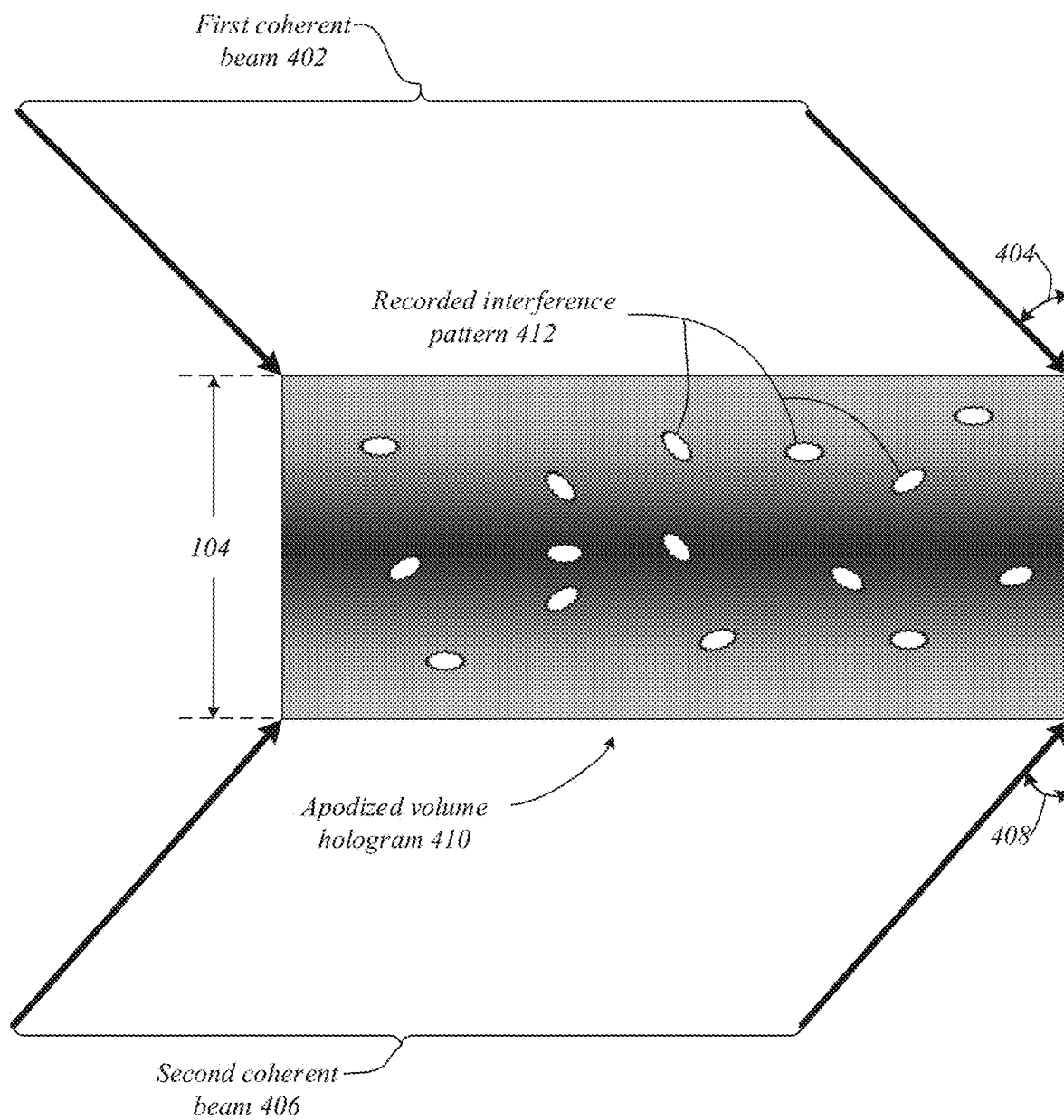

FIGS. 4A-4B illustrate exemplary arrangements 400A, 400B to process apodized holographic recording medium 100 into an apodized volume hologram 410. Exemplary arrangements 400A, 400B may illustrate processing apodized holographic recording medium 100 into apodized volume holograph 410 by exposing apodized holographic recording medium 100 to a first coherent beam 402 with a first angle of incidence 404 and a second coherent beam 406 with a second angle of incidence 408. In various embodiments, exposure of apodized holographic recording medium 100 to coherent beams 402, 406 may result in apodized volume hologram 410 with recorded interference pattern 412. Embodiments are not limited in this context.

In various embodiments, arrangement 400A may illustrate exposure of apodized holographic recording medium 100 to coherent beams 402, 406. In various such embodiments, arrangement 400B may illustrate recorded interference pattern 412 produced by the exposure of photosensitive molecules 102 of apodized holographic recording medium 100 to interference of coherent beams 402, 406. In some embodiments, coherent beams 402, 406 may originate from the same coherent beam. For instance, a coherent beam of light may be split into an illumination beam and a reference beam by a beam splitter. The illumination beam may be redirected, as an object beam, onto the apodized holographic recording medium 100 in a specific manner by encountering an object. In some embodiments, the object may provide multiplexed optical functions to be recorded in apodized volume hologram 410. For example, the object may be an array of lenses. The reference beam may be directed onto the apodized holographic recording medium 100 without encountering another object. The interference pattern of the object beam and the reference beam may be recorded in apodized volume holograph 410 by photosensitive molecules 102, as recorded interference pattern 412. Apodized volume hologram 410 may then be able to reproduce the light field of the object used to redirect illumination beam, as the object beam, onto apodized holographic recording medium 100.

Figure 5:
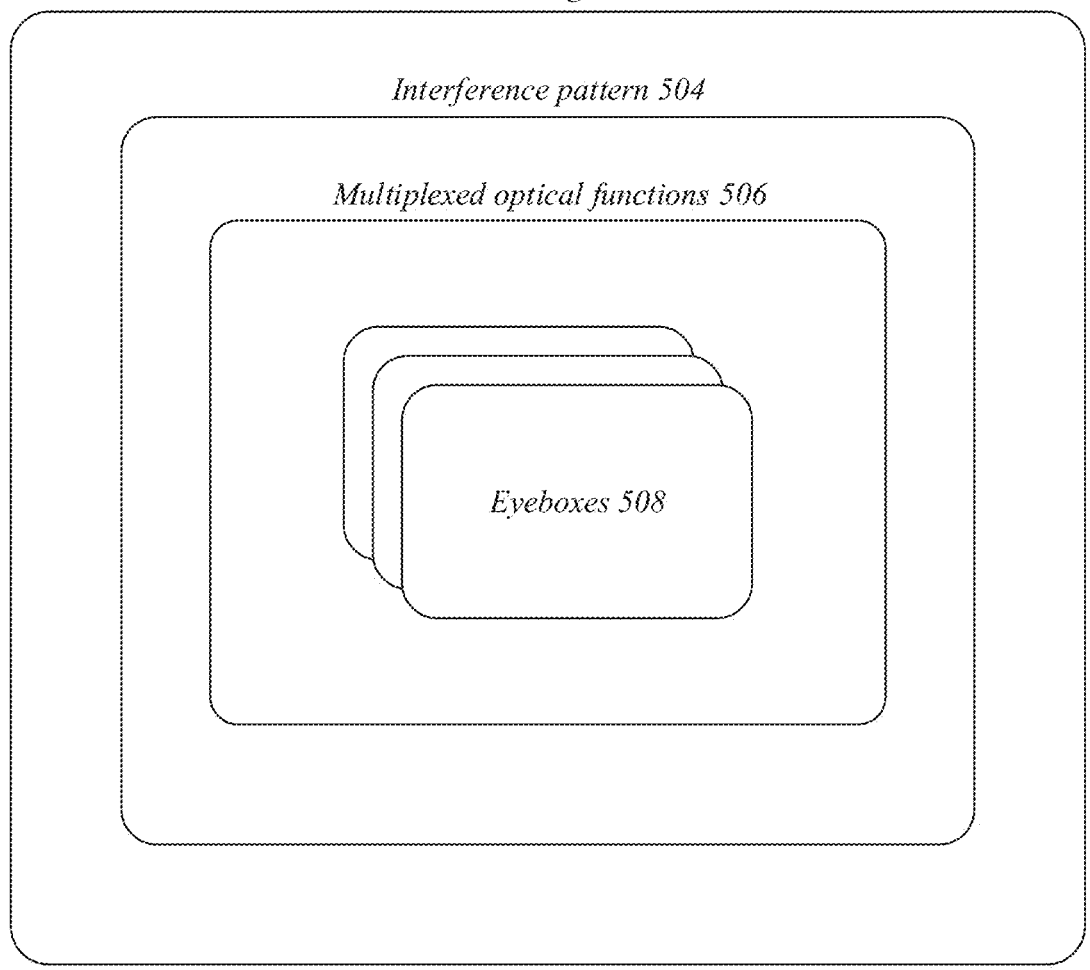
FIG. 5 illustrates an embodiment of a volume hologram.

FIG. 5 illustrates an embodiment of a volume hologram 502. Volume hologram 502 may include recorded interference pattern 504. In the illustrated embodiments, interference pattern 504 may include multiplexed optical functions 506. Multiplexed optical functions 506 may produce a plurality of eyeboxes 508. In some embodiments, eyeboxes 508 may be used in a computer-mediated reality device (see e.g., FIGS. 7A-7B). As will be described in more detail below (see e.g., FIGS. 6A-6B), by using apodized holographic recording medium 100 instead of raw holographic recording medium 200 to record interference pattern 504, eyeboxes 508 may be realized with little to no perceivable cross-talk or diffraction between the different eyeboxes 508 (e.g., ghost images). Embodiments are not limited in this context.

Figures 6A, 6B:
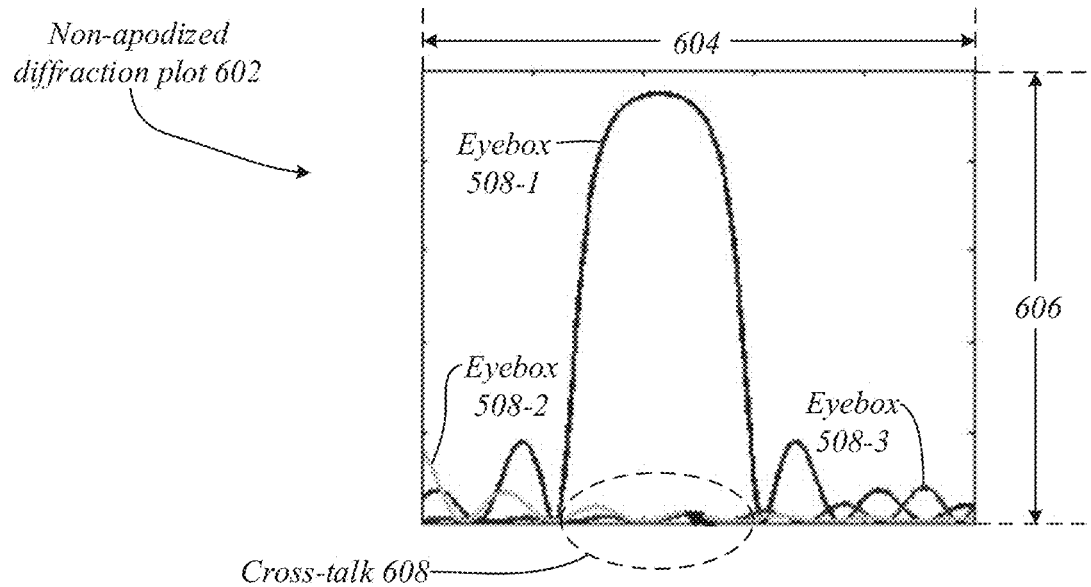
FIG. 6A illustrates an embodiment of a non-apodized diffraction curve.
FIG. 6B illustrates an embodiment of an apodized diffraction curve.

FIGS. 6A-6B illustrate embodiments of diffraction plots 602, 610. Diffraction plots 602, 610 may graphically represent variation in diffraction efficiency 606 as a function of angle of incidence 604 for each of a plurality of multiplexed optical functions in a volume hologram. For instance, non-apodized diffraction plot 602 may include diffraction curves associated with eyeboxes 508-1, 508-2, 508-3 if they were recorded in a raw holographic recording medium and apodized diffraction plot 610 may include diffraction curves associated with eyeboxes 508-1, 508-2, 508-3 if they were recorded in an apodized holographic recording medium. In various embodiments, cross-talk 608, 616 (e.g., intensity of ghost images) from eyeboxes 508-2 and 508-3 that is perceivable while aiming to display an image visible with eyebox 508-1 may manifest in the diffraction plots 602, 610 as side lobes of eyeboxes 508-2, 508-3 located under the diffraction peak of eyebox 508-1. In various embodiments, the shape of the diffraction plots 602, 610 may depend on the modulation of the variation of the refractive index through the holographic recording medium. In various such embodiments, the modulation of the variation of the refractive index through the material may be tailored by controlling the distribution of photosensitive molecules in the holographic recording medium. In some embodiments, tailoring or modulating the variation of the index of refraction throughout the thickness of a volume holograph, the side lobes of diffraction peaks for different eyeboxes may be drastically reduced while keeping the maximum diffraction efficiency. Embodiments are not limited in this context.

Referring to FIG. 6A, in some embodiments, non-apodized diffraction plot 602 may result from recording interference pattern 504 in raw holographic recording medium 200. Non-apodized diffraction plot 602 may indicate angle of incidence 604 versus diffraction efficiency 606 for multiplexed optical functions 506 recorded in raw holographic recording medium 200 (i.e., eyeboxes 508-1, 508-2, 508-3). In the illustrated embodiment, cross-talk 608 in non-apodized diffraction plot 602 can be seen as side lobes of eyeboxes 508-2, 508-3 under the diffraction peak of eyebox 508-1. Thus, in some embodiments, recording interference pattern 504 in raw holographic recording medium 200 can result in undesirable cross-talk 608 between different eyeboxes 508-1, 508-2, 508-3.

Referring to FIG. 6B, in some embodiments, apodized diffraction plot 610 may result from recording interference pattern 504 in apodized holographic recording medium 100. Apodized diffraction plot 602 may indicate angle of incidence 604 versus diffraction efficiency 606 for multiplexed optical functions 506 recorded in apodized holographic recording medium 100 for eyeboxes 508-1, 508-2, 508-3. In various embodiments, cross-talk 616 (e.g., intensity of ghost images) between different eyeboxes 508-1, 508-2, 508-3 may manifest in the apodized diffraction plot 602 as side lobes of eyeboxes 508-2, 508-3 located under the diffraction peak of eyebox 508-1. However, in the illustrated embodiment, there is little to no perceivable cross-talk 616 because eyeboxes 508-2, 508-3 have little to no side lobes under the diffraction peak of eyebox 508-1. Thus, in some embodiments, recording interference patter 504 in apodized holographic recording medium 100 can result in little to no perceivable cross-talk 616 between different eyeboxes 508-1, 508-2, 508-3.

Figure 7A:
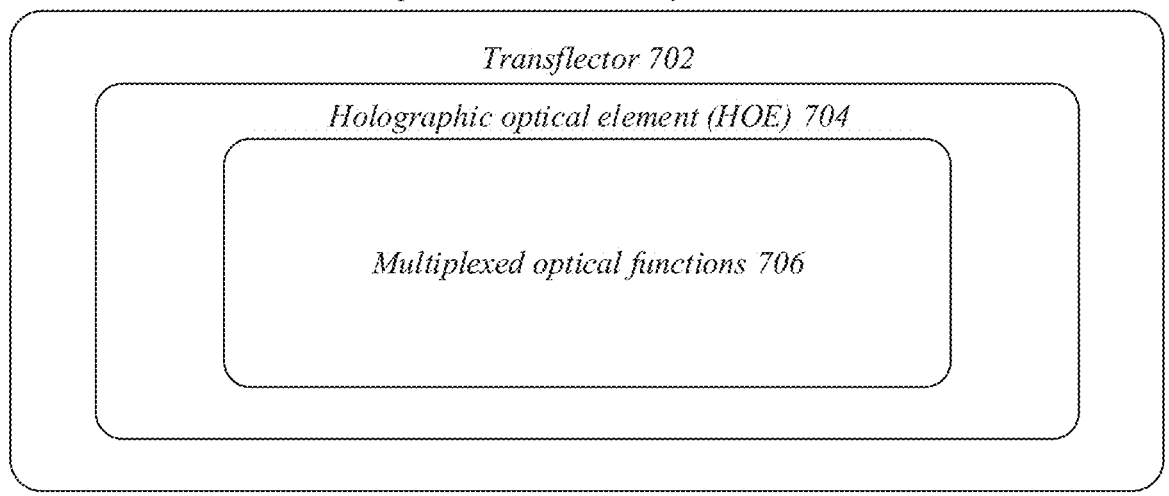
FIGS. 7A-7B illustrate embodiments of a computer-mediated reality device.
Figure 7B:
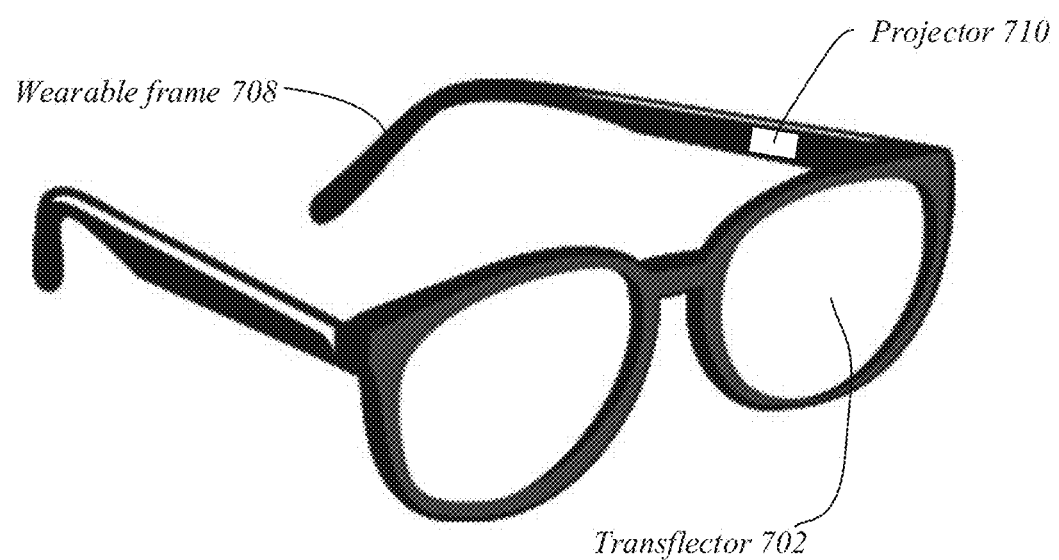

FIGS. 7A-7B illustrate embodiments of a computer-mediated reality device 700. Computer-mediated reality device 700 may include a transflector 702, holographic optical element (HOE) 704 with multiplexed optical functions 706, wearable frame 708, and projector 710. In various embodiments, apodized volume hologram 410 may be used in computer-mediated reality device 700 as HOE 704 to provide multiplexed optical functions 706 with little to no perceivable diffraction between the multiplexed optical functions 706. In various such embodiments, an improved computer-mediated reality device 700 may be realized by using apodized volume hologram 410 as HOE 704. In some embodiments multiplexed optical functions 706 may include eyeboxes 508 of multiplexed optical functions 506. Embodiments are not limited in this context.

In some embodiments, wearable frame 708 may hold projector 710 in a certain position with respect to transflector 702. For example, wearable frame 708 may hold projector 710 at a spacing and angle with respect to transflector 702 such that images are appropriately reflected by transflector 702 to be viewed by a user. In various embodiments, transflector 702 may be a transparent screen that reflects light from projector 710, to redirect light to an eye of a user. In various such embodiments, transflector 702 may perform two primary functions. It may allow ambient light from the environment to pass through, providing normal vision to a user and it may redirect light from projector 710 to the eye of a user to provide a display image on the retina. In some embodiments, HOE 704 of transflector 702 may enable images projected onto transflector 702 by projector 710 to be visible to a user by reflecting light according to multiplex optical functions 706.

In various embodiments, multiplexed optical functions 706 (e.g., eyeboxes 508) may enable multiple images to simultaneously appear to a user or different images to appear to a user based on a position of the eye of the user. In various such embodiments, each of the multiple or different images that may be viewed may be realized with one or more different optical functions of multiplexed optical functions 706. For instance, each image may appear in a different eyebox of eyeboxes 508. In various embodiments, light projected by projector 710 may be directed to one or more of eyeboxes 508 based on the wavelength or angle of incidence of the projected light. In some embodiments, recording multiplexed optical functions 706 of HOE 704 in apodized holographic recording medium 100 may prevent diffraction between the multiple or different images (e.g., different eyeboxes 508), enabling the multiple or different images to appear with little to no cross-talk (e.g., cross-talk 616) from other of the multiple or different images.

FIG. 8 illustrates one embodiment of a logic flow 800. Logic flow 800 may be representative of some or all of the operations executed by or on one or more embodiments described herein, such as raw holographic recording medium 200. Embodiments are not limited in this context.

In the illustrated embodiment shown in FIG. 8, the logic flow 800 may begin at block 802. At block 802, a holographic recording medium comprising a top surface, a bottom surface, and a set of photosensitive molecules with a uniform distribution between the top surface and the bottom surface may be arranged for exposure to a first beam of incoherent light arranged at a first angle of incidence with respect to the top surface and a second beam of incoherent light arranged at a second angle of incidence with respect to the bottom surface. For example, raw holographic recording medium 200 may be arranged with respect to first incoherent beam 302 at angle of incidence 304 and second incoherent beam 306 at angle of incidence 308.

Continuing to block 804, the holographic recording medium may be exposed to the first and second beams of incoherent light to desensitize a first subset of the set of photosensitive molecules to leave a second subset of the set of photosensitive molecules with a non-uniform distribution between the top surface and the bottom surface of the holographic recording medium. For example, raw holographic recording medium 200 may be exposed to first incoherent beam 302 and second incoherent beam 306 to desensitize a subset of photosensitive molecules 202 to produce apodized holographic recording medium 100 with photosensitive molecules 102. In some embodiments, photosensitive molecules 102 may be a subset of photosensitive molecules 202. In various embodiments, photosensitive molecules 102 may correlate to photosensitive molecule distribution 112. In some embodiments, photosensitive molecules 102 may result in apodized grating structure 116.

The following examples pertain to further embodiments, from which numerous permutations and configurations will be apparent.

Example 1 is an apparatus to process holographic recording media, the apparatus comprising: a holographic recording medium to comprise a top surface, a bottom surface, and a set of photosensitive molecules with a uniform distribution between the top surface and the bottom surface; a first beam of incoherent light arranged at a first angle of incidence with respect to the top surface; and a second beam of incoherent light arranged at a second angle of incidence with respect to the bottom surface, the first and second beams of incoherent light to desensitize a first subset of the set of photosensitive molecules to leave a second subset of the set of photosensitive molecules with a non-uniform distribution between the top surface and the bottom surface of the holographic recording medium.

Example 2 includes the subject matter of Example 1, the non-uniform distribution to correlate to a non-uniform apodization function.

Example 3 includes the subject matter of Example 1, the non-uniform distribution between the top and bottom surfaces of the holographic recording medium such that a lower concentration of photosensitive molecules is proximate the top and bottom surfaces and a higher concentration of photosensitive molecules is proximate a midpoint between the top and bottom surfaces.

Example 4 includes the subject matter of Example 1, the non-uniform distribution comprising a Gaussian distribution.

Example 5 includes the subject matter of Example 1, comprising a first beam of coherent light and a second beam of coherent light, the first and second beams of coherent light arranged to intersect within the holographic recording medium, intersection of the first and second beams of coherent light to cause an interference pattern, the second subset of photosensitive molecules to record the interference pattern.

Example 6 includes the subject matter of Example 5, the interference pattern recorded by the second subset of photosensitive molecules to produce one or more multiplexed optical functions.

Example 7 includes the subject matter of Example 6, comprising a transflector, the transflector to include the holographic recording medium.

Example 8 includes the subject matter of Example 7, comprising a computer-mediated reality device, the computer-mediated reality device to include the transflector.

Example 9 includes the subject matter of Example 1, the first beam of incoherent light to include a first predetermined range of wavelengths and the second beam of incoherent light to include a second predetermined range of wavelengths.

Example 10 includes the subject matter of Example 9, the first and second predetermined range of wavelengths selected based on one or more target parameters of the non-uniform distribution of the second subset of photosensitive molecules.

Example 11 includes the subject matter of Example 1, the first and second angles of incidence selected based on one or more target parameters of the non-uniform distribution of the second subset of photosensitive molecules.

Example 12 includes the subject matter of Example 1, a power ratio between the first and second beams of incoherent light selected based on one or more target parameters of the non-uniform distribution of the second subset of photosensitive molecules.

Example 13 includes the subject matter of Example 1, a concentration of the set of photosensitive molecules with the uniform distribution selected based on one or more target parameters of the non-uniform distribution of the second subset of photosensitive molecules.

Example 14 includes the subject matter of Example 1, a distance between the top surface and the bottom surface selected based on one or more target parameters of the non-uniform distribution of the second subset of photosensitive molecules.

Example 15 includes the subject matter of Example 1, the uniform distribution of the set of photosensitive molecules between the top and bottom surfaces such that a concentration of photosensitive molecules is substantially constant between the top and bottom surfaces.

Example 16 includes the subject matter of Example 1, the uniform distribution of the set of photosensitive molecules between the top and bottom surfaces such that the photosensitive molecules are evenly spaced apart.

Example 17 is a method to process holographic recording media, the method comprising: arranging a holographic recording medium comprising a top surface, a bottom surface, and a set of photosensitive molecules with a uniform distribution between the top surface and the bottom surface for exposure to a first beam of incoherent light arranged at a first angle of incidence with respect to the top surface and a second beam of incoherent light arranged at a second angle of incidence with respect to the bottom surface; and exposing the holographic recording medium to the first and second beams of incoherent light to desensitize a first subset of the set of photosensitive molecules to leave a second subset of the set of photosensitive molecules with a non-uniform distribution between the top surface and the bottom surface of the holographic recording medium.

Example 18 includes the subject matter of Example 17, the non-uniform distribution correlating to a non-uniform apodization function.

Example 19 includes the subject matter of Example 17, the non-uniform distribution between the top and bottom surfaces of the holographic recording medium such that a lower concentration of photosensitive molecules is proximate the top and bottom surfaces and a higher concentration of photosensitive molecules is proximate a midpoint between the top and bottom surfaces.

Example 20 includes the subject matter of Example 17, the non-uniform distribution comprising a Gaussian distribution.

Example 21 includes the subject matter of Example 17, comprising: arranging the holographic recording medium for exposure to a first beam of coherent light and a second beam of coherent light, the first and second beams of coherent light arranged to intersect within the holographic recording medium, intersection of the first and second beams of coherent light to cause an interference pattern within the holographic recording medium; and exposing the holographic recording medium to the first and second beams of coherent light to cause the second subset of photosensitive molecules to record the interference pattern.

Example 22 includes the subject matter of Example 21, the interference pattern recorded by the second subset of photosensitive molecules to produce one or more multiplexed optical functions.

Example 23 includes the subject matter of Example 22, comprising a transflector, the transflector including the holographic recording medium.

Example 24 includes the subject matter of Example 23, comprising a computer-mediated reality device, the computer-mediated reality device including the transflector.

Example 25 includes the subject matter of Example 17, comprising selecting an amount of time for exposing the holographic recording medium to the first and second beams of coherent light based on one or more target parameters of the non-uniform distribution of the second subset of the set of photosensitive molecules.

Example 26 includes the subject matter of Example 17, the first beam of incoherent light including a first predetermined range of wavelengths and the second beam of incoherent light including a second predetermined range of wavelengths.

Example 27 includes the subject matter of Example 26, comprising selecting the first and second predetermined range of wavelengths based on one or more target parameters of the non-uniform distribution of the second subset of photosensitive molecules.

Example 28 includes the subject matter of Example 17, comprising selecting the first and second angles of incidence based on one or more target parameters of the non-uniform distribution of the second subset of photosensitive molecules.

Example 29 includes the subject matter of Example 17, comprising selecting a power ratio between the first and second beams of incoherent light based on one or more target parameters of the non-uniform distribution of the second subset of photosensitive molecules.

Example 30 includes the subject matter of Example 17, comprising selecting a concentration of the set of photosensitive molecules with the uniform distribution based on one or more target parameters of the non-uniform distribution of the second subset of photosensitive molecules.

Example 31 includes the subject matter of Example 17, comprising selecting a distance between the top surface and the bottom surface based on one or more target parameters of the non-uniform distribution of the second subset of photosensitive molecules.

Example 32 includes the subject matter of Example 17, the uniform distribution of the set of photosensitive molecules between the top and bottom surfaces such that a concentration of photosensitive molecules is substantially constant between the top and bottom surfaces.

Example 33 includes the subject matter of Example 17, the uniform distribution of the set of photosensitive molecules between the top and bottom surfaces such that the photosensitive molecules are evenly spaced apart.

Example 34 is an apparatus to process holographic recording media, the apparatus comprising: means for arranging a holographic recording medium comprising a top surface, a bottom surface, and a set of photosensitive molecules with a uniform distribution between the top surface and the bottom surface for exposure to a first beam of incoherent light arranged at a first angle of incidence with respect to the top surface and a second beam of incoherent light arranged at a second angle of incidence with respect to the bottom surface; and means for exposing the holographic recording medium to the first and second beams of incoherent light to desensitize a first subset of the set of photosensitive molecules to leave a second subset of the set of photosensitive molecules with a non-uniform distribution between the top surface and the bottom surface of the holographic recording medium.

Example 35 includes the subject matter of Example 34, the non-uniform distribution correlating to a non-uniform apodization function.

Example 36 includes the subject matter of Example 34, the non-uniform distribution between the top and bottom surfaces of the holographic recording medium such that a lower concentration of photosensitive molecules is proximate the top and bottom surfaces and a higher concentration of photosensitive molecules is proximate a midpoint between the top and bottom surfaces.

Example 37 includes the subject matter of Example 34, the non-uniform distribution comprising a Gaussian distribution.

Example 38 includes the subject matter of Example 34, comprising: means for arranging the holographic recording medium for exposure to a first beam of coherent light and a second beam of coherent light, the first and second beams of coherent light arranged to intersect within the holographic recording medium, intersection of the first and second beams of coherent light to cause an interference pattern within the holographic recording medium; and means for exposing the holographic recording medium to the first and second beams of coherent light to cause the second subset of photosensitive molecules to record the interference pattern.

Example 39 includes the subject matter of Example 38, the interference pattern recorded by the second subset of photosensitive molecules to produce one or more multiplexed optical functions.

Example 40 includes the subject matter of Example 39, comprising a transflector, the transflector including the holographic recording medium.

Example 41 includes the subject matter of Example 40, comprising a computer-mediated reality device, the computer-mediated reality device including the transflector.

Example 42 includes the subject matter of Example 34, comprising means for selecting an amount of time for exposing the holographic recording medium to the first and second beams of coherent light based on one or more target parameters of the non-uniform distribution of the second subset of the set of photosensitive molecules.

Example 43 includes the subject matter of Example 34, the first beam of incoherent light including a first predetermined range of wavelengths and the second beam of incoherent light including a second predetermined range of wavelengths.

Example 44 includes the subject matter of Example 43, comprising means for selecting the first and second predetermined range of wavelengths based on one or more target parameters of the non-uniform distribution of the second subset of photosensitive molecules.

Example 45 includes the subject matter of Example 34, comprising means for selecting the first and second angles of incidence based on one or more target parameters of the non-uniform distribution of the second subset of photosensitive molecules.

Example 46 includes the subject matter of Example 34, comprising means for selecting a power ratio between the first and second beams of incoherent light based on one or more target parameters of the non-uniform distribution of the second subset of photosensitive molecules.

Example 47 includes the subject matter of Example 34, comprising means for selecting a concentration of the set of photosensitive molecules with the uniform distribution based on one or more target parameters of the non-uniform distribution of the second subset of photosensitive molecules.

Example 48 includes the subject matter of Example 34, comprising means for selecting a distance between the top surface and the bottom surface based on one or more target parameters of the non-uniform distribution of the second subset of photosensitive molecules.

Example 49 includes the subject matter of Example 34, the uniform distribution of the set of photosensitive molecules between the top and bottom surfaces such that a concentration of photosensitive molecules is substantially constant between the top and bottom surfaces.

Example 50 includes the subject matter of Example, the uniform distribution of the set of photosensitive molecules between the top and bottom surfaces such that the photosensitive molecules are evenly spaced apart.

Example 51 is a system to provide optical functions, the system comprising: a volume hologram comprising a holographic recording medium with a top surface, a bottom surface, and an interference pattern, the interference pattern recorded in a set of photosensitive molecules with a non-uniform distribution between the top surface and the bottom surface, the interference pattern to include multiplexed optical functions.

Example 52 includes the subject matter of Example 51, comprising a projector to project an image onto the volume hologram.

Example 53 includes the subject matter of Example 52, the projector to project the image with light in a first range of wavelengths to utilize a first optical function of the multiplexed optical functions and light in a second range of wavelengths to utilize a second optical function of the multiplexed optical functions.

Example 54 includes the subject matter of Example 53, the first optical function to produce a first eyebox with the image in response to projection of the image with light in the first range of wavelengths.

Example 55 includes the subject matter of Example 53, the second optical function to produce a second eyebox with the image in response to projection of the image with light in the second range of wavelengths.

Example 56 includes the subject matter of Example 52, the projector to project the image with light having a first angle of incidence with respect to a surface of the volume hologram to utilize a first optical function of the multiplexed optical functions and light having a second angle of incidence with respect to the surface of the volume hologram to utilize a second optical function of the multiplexed optical functions.

Example 57 includes the subject matter of Example 56, the first optical function to produce a first eyebox with the image in response to projection of the image with light at the first angle of incidence.

Example 58 includes the subject matter of Example 56, the second optical function to produce a second eyebox with the image in response to projection of the image with light at the second angle of incidence.

Example 59 includes the subject matter of Example 51, the holographic recording medium comprising an apodized grating structure with a predefined modulation of variation in refractive index between the top and bottom surfaces.

Example 60 includes the subject matter of Example 51, the non-uniform distribution comprising a Gaussian distribution.

Example 61 includes the subject matter of Example 51, the interference pattern to reproduce a light field of an array of lenses.

Example 62 includes the subject matter of Example 51, comprising a computer-mediated reality device comprising a projector and a transflector comprising the volume hologram, the projector and the transflector mounted to a wearable frame.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A system, comprising:
a volume hologram comprising a holographic recording medium with a top surface, a bottom surface, and an interference pattern, the interference pattern recorded in a set of photosensitive molecules with a non-uniform distribution between the top surface and the bottom surface, the interference pattern to include multiplexed optical functions, wherein the holographic recording medium has a predefined modulation of variation in refractive index between the top and bottom surfaces to provide an apodized grating structure.

2. The system of claim 1, comprising a projector to project an image onto the volume hologram.

3. The system of claim 2, the projector to project the image with light in a first range of wavelengths to utilize a first optical function of the multiplexed optical functions and light in a second range of wavelengths to utilize a second optical function of the multiplexed optical functions.

4. The system of claim 3, the first optical function to produce a first eyebox with the image in response to projection of the image with light in the first range of wavelengths.

5. The system of claim 3, the second optical function to produce a second eyebox with the image in response to projection of the image with light in the second range of wavelengths.

6. The system of claim 2, the projector to project the image with light having a first angle of incidence with respect to a surface of the volume hologram to utilize a first optical function of the multiplexed optical functions and light having a second angle of incidence with respect to the surface of the volume hologram to utilize a second optical function of the multiplexed optical functions.

7. The system of claim 6, the first optical function to produce a first eyebox with the image in response to projection of the image with light at the first angle of incidence.

8. The system of claim 6, the second optical function to produce a second eyebox with the image in response to projection of the image with light at the second angle of incidence.

9. The system of claim 1, the photosensitive molecules with a non-uniform distribution generated from photosensitive molecules with a uniform distribution exposed to incoherent light.

10. The system of claim 9, the non-uniform distribution comprising a Gaussian distribution.

11. The system of claim 1, the interference pattern to reproduce a light field of an array of lenses.

12. An apparatus, comprising:
a wearable frame; and
a volume hologram coupled to the wearable frame, the volume hologram comprising a holographic recording medium with a top surface, a bottom surface, and an interference pattern, the interference pattern recorded in a set of photosensitive molecules with a non-uniform distribution between the top surface and the bottom surface, the interference pattern to include multiplexed optical functions, wherein the holographic recording medium has a predefined modulation of variation in refractive index between the top and bottom surfaces to provide an apodized grating structure.

13. The apparatus of claim 12, comprising a projector coupled to the frame, the projector to project an image onto the volume hologram.

14. The apparatus of claim 13, the projector to project the image with light in a first range of wavelengths to utilize a first optical function of the multiplexed optical functions and light in a second range of wavelengths to utilize a second optical function of the multiplexed optical functions.

15. The apparatus of claim 14, the first optical function to produce a first eyebox with the image in response to projection of the image with light in the first range of wavelengths.

16. The apparatus of claim 14, the second optical function to produce a second eyebox with the image in response to projection of the image with light in the second range of wavelengths.

17. The apparatus of claim 13, the projector to project the image with light having a first angle of incidence with respect to a surface of the volume hologram to utilize a first optical function of the multiplexed optical functions and light having a second angle of incidence with respect to the surface of the volume hologram to utilize a second optical function of the multiplexed optical functions.

18. The apparatus of claim 17, the first optical function to produce a first eyebox with the image in response to projection of the image with light at the first angle of incidence.

19. The apparatus of claim 17, the second optical function to produce a second eyebox with the image in response to projection of the image with light at the second angle of incidence.

20. The apparatus of claim 12, the photosensitive molecules with a non-uniform distribution generated from photosensitive molecules with a uniform distribution exposed to incoherent light.

21. The apparatus of claim 20, the non-uniform distribution to correlate to a nonuniform apodization function.

22. The apparatus of claim 21, the non-uniform distribution comprising a Gaussian distribution.

23. The apparatus of claim 12, the interference pattern to reproduce a light field of an array of lenses.

24. A system, comprising:
a volume hologram comprising a holographic recording medium with a top surface, a bottom surface, and an interference pattern, the interference pattern recorded in a set of photosensitive molecules with a non-uniform distribution between the top surface and the bottom surface,
wherein the photosensitive molecules with a non-uniform distribution are generated from photosensitive molecules with a uniform distribution exposed to incoherent light, the non-uniform distribution to correlate to a non-uniform apodization function, and the holographic recording medium having a predefined modulation of variation in refractive index between the top and bottom surfaces to provide an apodized grating structure.

25. The system of claim 24, comprising a projector to project an image onto the volume hologram.

26. The system of claim 25, the projector to project the image with light in a first range of wavelengths to utilize a first optical function of the interference pattern and light in a second range of wavelengths to utilize a second optical function of the interference pattern.

27. The system of claim 26, the first optical function to produce a first eyebox with the image in response to projection of the image with light in the first range of wavelengths.

28. The system of claim 26, the second optical function to produce a second eyebox with the image in response to projection of the image with light in the second range of wavelengths.

29. The system of claim 25, the projector to project the image with light having a first angle of incidence with respect to a surface of the volume hologram to utilize a first optical function of the interference pattern and light having a second angle of incidence with respect to the surface of the volume hologram to utilize a second optical function of the interference pattern.

30. The system of claim 29, the first optical function to produce a first eyebox with the image in response to projection of the image with light at the first angle of incidence.

31. The system of claim 29, the second optical function to produce a second eyebox with the image in response to projection of the image with light at the second angle of incidence.

32. The system of claim 24, the interference pattern to reproduce a light field of an array of lenses.

33. An apparatus, comprising:
a hologram coupled to the wearable frame, the hologram comprising a holographic recording medium with a top surface, a bottom surface, and an interference pattern, the interference pattern recorded in a set of photosensitive molecules with a non-uniform distribution between the top surface and the bottom surface, the interference pattern to include multiplexed optical functions,
wherein the photosensitive molecules with a non-uniform distribution generated from photosensitive molecules with a uniform distribution exposed to incoherent light, the non-uniform distribution to correlate to a non-uniform apodization function, and the holographic recording medium having a predefined modulation of variation in refractive index between the top and bottom surfaces to provide an apodized grating structure.

34. The apparatus of claim 33, comprising a projector to project an image onto the hologram.

35. The apparatus of claim 34, the projector to project the image with light in a first range of wavelengths to utilize a first optical function of the multiplexed optical functions and light in a second range of wavelengths to utilize a second optical function of the multiplexed optical functions.

36. The apparatus of claim 35, the first optical function to produce a first eyebox with the image in response to projection of the image with light in the first range of wavelengths.

37. The apparatus of claim 35, the second optical function to produce a second eyebox with the image in response to projection of the image with light in the second range of wavelengths.

38. The apparatus of claim 34, the projector to project the image with light having a first angle of incidence with respect to a surface of the volume hologram to utilize a first optical function of the multiplexed optical functions and light having a second angle of incidence with respect to the surface of the volume hologram to utilize a second optical function of the multiplexed optical functions.

39. The apparatus of claim 38, the first optical function to produce a first eyebox with the image in response to projection of the image with light at the first angle of incidence.

40. The apparatus of claim 38, the second optical function to produce a second eyebox with the image in response to projection of the image with light at the second angle of incidence.

41. The apparatus of claim 33, the non-uniform distribution comprising a Gaussian distribution.

42. The apparatus of claim 33, the interference pattern to reproduce a light field of an array of lenses.

* * * * *